United States Patent
Yin et al.

(10) Patent No.: US 8,954,389 B2
(45) Date of Patent: Feb. 10, 2015

(54) CONTENT GENERATION SERVICE FOR SOFTWARE TESTING

(71) Applicant: Dell Products, LP, Round Rock, TX (US)

(72) Inventors: Jianwen Yin, Round Rock, TX (US); Li Jun Zhou, Shanghai (CN); Thomas P. Maddox, Austin, TX (US); Ryan D. King, Austin, TX (US); Tsen-Loong Peng, Austin, TX (US)

(73) Assignee: Dell Products, LP, Round Rock, TX (US)

( * ) Notice: Subject to any disclaimer, the term of this patent is extended or adjusted under 35 U.S.C. 154(b) by 83 days.

(21) Appl. No.: 13/691,447

(22) Filed: Nov. 30, 2012

(65) Prior Publication Data

US 2014/0156630 A1   Jun. 5, 2014

(51) Int. Cl.
*G06F 17/30* (2006.01)
(52) U.S. Cl.
CPC ............... *G06F 17/30867* (2013.01)
USPC .......................................... 707/631; 707/705
(58) Field of Classification Search
None
See application file for complete search history.

(56) References Cited

U.S. PATENT DOCUMENTS

| | | | |
|---|---|---|---|
| 8,140,905 B2 | 3/2012 | Beaty et al. | |
| 8,255,529 B2 | 8/2012 | Ferris et al. | |
| 2003/0028889 A1* | 2/2003 | McCoskey et al. | 725/91 |
| 2007/0276926 A1* | 11/2007 | LaJoie et al. | 709/219 |
| 2009/0300423 A1 | 12/2009 | Ferris | |
| 2010/0293048 A1* | 11/2010 | Singolda et al. | 705/14.43 |
| 2011/0010691 A1 | 1/2011 | Lu et al. | |
| 2011/0231899 A1 | 9/2011 | Pulier et al. | |
| 2012/0174068 A1 | 7/2012 | Gutfleisch et al. | |
| 2012/0266135 A1 | 10/2012 | Mansour et al. | |
| 2013/0013428 A1* | 1/2013 | Lyon et al. | 705/14.73 |

OTHER PUBLICATIONS

"Automated Software Test Data Generation," Bogdan Korel, IEEE Transactions on Software Engineering, vol. 16, No. 8, Aug. 1990.

* cited by examiner

*Primary Examiner* — Wilson Lee
(74) *Attorney, Agent, or Firm* — Larson Newman, LLP

(57) ABSTRACT

A method includes receiving a request to generate data which describes the data. A database of seed content and an algorithms database are searched. If both seed content and an algorithm are found, the algorithm is applied to the seed content, thereby generating data. Some embodiments may include advertising a content generation service. Users may register for the service.

22 Claims, 5 Drawing Sheets

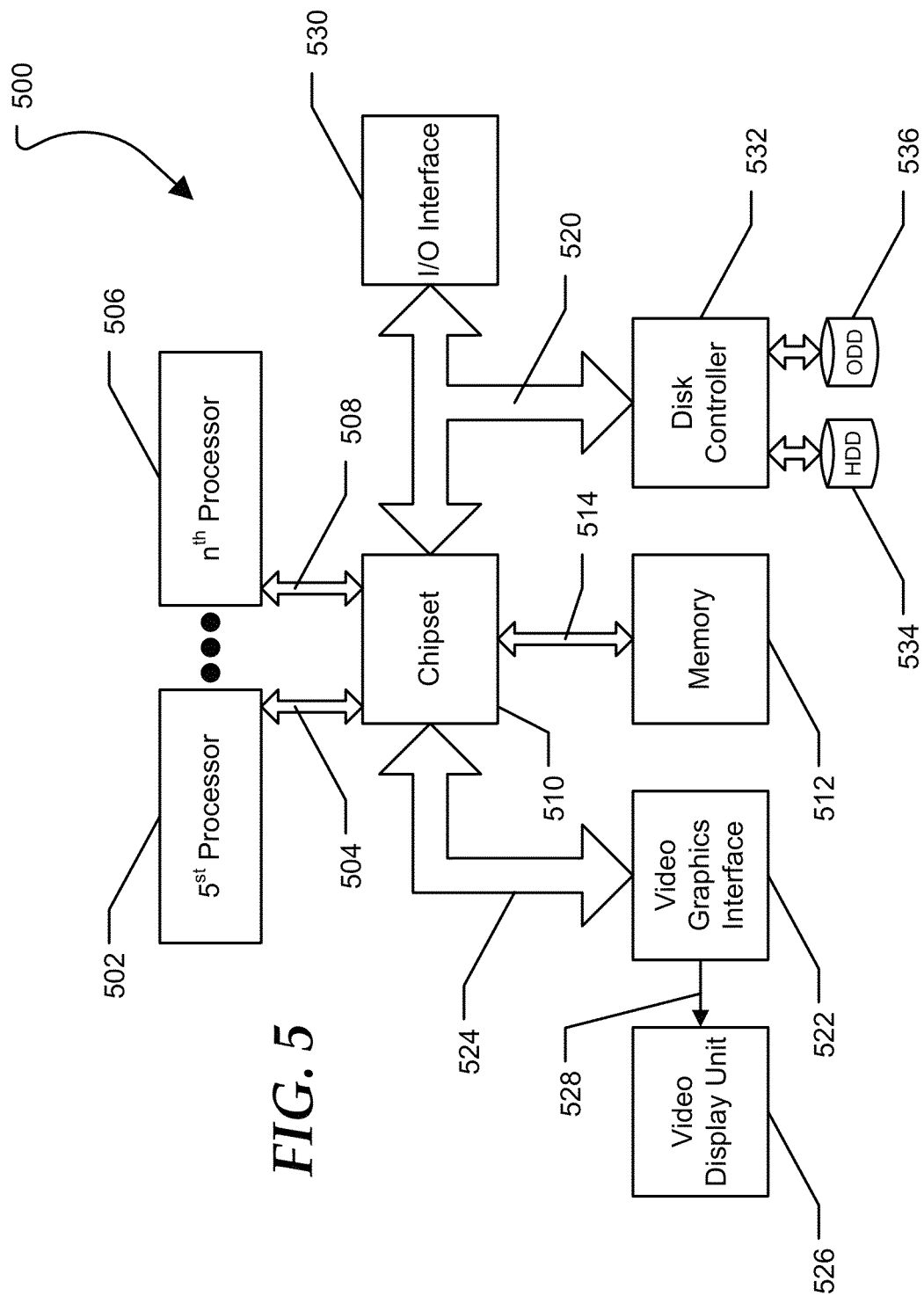

CONTENT GENERATION SERVICE FOR SOFTWARE TESTING

FIELD OF THE DISCLOSURE

This disclosure relates generally to information handling systems, and relates more particularly to the generation of content for software testing.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements can vary between different applications, information handling systems can also vary regarding what information is handled, how the information is handled, how much information is processed, stored, or communicated, and how quickly and efficiently the information can be processed, stored, or communicated. The variations in information handling systems allow for information handling systems to be general or configured for a specific user or specific use such as financial transaction processing, airline reservations, enterprise data storage, or global communications. In addition, information handling systems can include a variety of hardware and software components that can be configured to process, store, and communicate information and can include one or more computer systems, data storage systems, and networking systems. Information handling systems may generate content for software testing.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which:

FIG. 5 is a block diagram illustrating an information handling system according to one aspect of the disclosure.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be utilized in this application. The teachings can also be utilized in other applications and with several different types of architectures such as distributed computing architectures, client/server architectures, or middleware server architectures and associated components.

For purposes of this disclosure, an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system can be a personal computer, a PDA, a consumer electronic device, a network server or storage device, a switch router, wireless router, or other network communication device, or any other suitable device and can vary in size, shape, performance, functionality, and price. The information handling system can include memory, one or more processing resources such as a central processing unit (CPU) or hardware or software control logic. Additional components of the information handling system can include one or more storage devices, one or more communications ports for communicating with external devices as well as various input and output (I/O) devices, such as a keyboard, a mouse, and a video display. The information handling system can also include one or more buses operable to transmit communications between the various hardware components.

Figure 1:
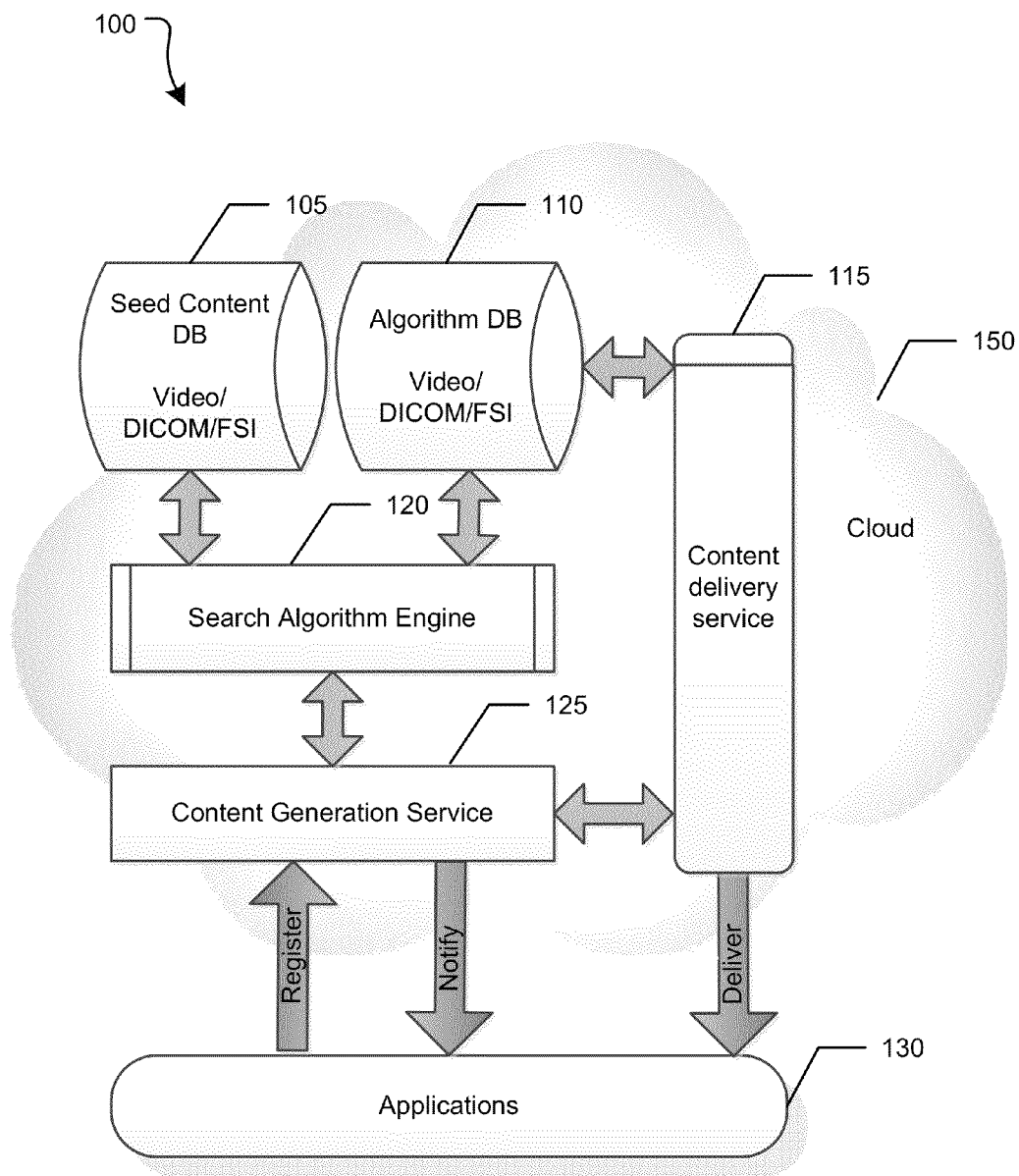
FIG. 1 is a block diagram illustrating a system to provide a content generation service according to one aspect of the disclosure.

FIG. 1 shows a system 100 to provide a content generation service. System 100 includes seed content database (DB) 105, algorithm DB 110, content delivery service 115, search engine 120, and content generation service 125. In the embodiment of FIG. 1, the components of system 100 are located in network 150. System 100 communicates with applications 130 and provides content for software testing to the applications.

Seed content DB 105 may contain seed content for the generation of data for software testing. Seed content DB 105 may consist of a standard type of database, such as a relational database, an object database, or an Extensible Markup Language (XML) database.

The seed content may consist of sample data suitable for testing various types of software. The seed content may be expanded into data of the desired size for software testing by the application of algorithms from algorithm DB 110. In some embodiments, seed content DB 105 may contain seed content for each of multiple data types for different vertical lines of business. A vertical line of business, or vertical, may include a line of business or an industry such as health care; banking; video surveillance; photography; finance, security, and insurance businesses (FSI businesses); and data archiving, including intelligent data management. A vertical may include similar businesses engaged in trade based on specific and specialized needs. Data types may include Digital Imaging and Communications in Medicine (DICOM) for medical images in the Picture Archiving and Communication System (PACS), the Radiology Information System (RIS), and the Hospital Information System (HIS); video streaming clips with different resolutions, different color depths, different data rates for video surveillance; digital documents such as scanned documents for digital forensics; database contents for banking solutions; and data types for FSI businesses.

Algorithm database 110 may contain algorithms for generating content for software testing. In some embodiments, seed content DB 105 may not provide sufficient data for testing an application. An algorithm in algorithm DB 110 may generate additional data from the samples in seed content DB 105. As input, an algorithm in algorithm DB 110 may receive seed content of the desired kind of data and a specification of the desired kind of data. The specification may describe the data and may provide parameters of the desired data such as the size, color depth, and data rate. The algorithm may then generate the desired data from the seed content.

The algorithms may range from simple to complex. The simplest algorithms may merely append or concatenate duplicates of records in seed content DB 105 to bulk up the amount. More complicated algorithms may serialize the records; that is, produce records that differ in one or more identification fields. The newly-generated records may, for example, contain newly-generated record identifiers such as record numbers or newly-generated patient identification information. Still more complicated algorithms may involve image processing algorithms or video compression/decompression with different kinds of coder/decoders (codecs).

Search algorithm engine 120 may find a suitable algorithm and seed content to generate content to perform testing on one of the applications from applications 130. Search algorithm engine 120 may be provided with the vertical, the data type, and the size of the desired data as input. Based on the input, the algorithms in search algorithm engine 120 may search for an appropriate algorithm in algorithm DB 110 and appropriate seed content in seed content DB 105. The algorithms in algorithm DB 110 and the seed content in seed content DB 105 may, for example, be organized by data type within verticals, and search algorithm engine 120 may search algorithm DB 110 and seed content DB 105 by vertical and data type.

Content generation service 125 may communicate with parties responsible for the testing of the applications in applications 130 concerning the generation of test data for the applications. The parties may be employees of a business that markets the applications or a third-party that is hired to develop and test the applications. In some embodiments, content generation service 125 may constitute the front end of a service to provide data for software testing, and seed content DB 105, algorithm DB 110, and search algorithm engine may constitute a portion of the back end of the service. In some embodiments, the parties may register with content generation service 125. The registration may be through the Internet or through contact with a customer service representative. The registration may include targeting information such as an Internet protocol (IP) address and a delivery mechanism for testing data, such as file transfer protocol (FTP). The registration may also describe the type, the size and the vertical of the content to be used. The parties may also submit requests for content to content generation service 125. In some embodiments, some requests may be made as part of registration. In other embodiments, requests for content may be separate from registration. In further embodiments, the registration process or the request process may include a mechanism for obtaining payment for the provision of test data. Upon receiving the requests, content generation service 125 may then utilize search engine 120, seed content DB 105, and algorithm DB 110 to generate data to fulfill the requests. Search engine 120 may find suitable seed content and algorithms, and the data may be produced by applying the algorithms to the seed content.

Content generation service 125 may also notify the parties, such as the developers of the applications, of the availability of test data. The notification may include advertising the availability of a content generation service. The advertising may constitute an attempt to persuade business entities to utilize the service. The advertising may be directed to the general public, to technology partners of the business providing the service, or to software developers in general. It may also be directed to particular business segments of the software market, such as developers and vendors of software to fulfill particular business needs, such as the data processing of health companies, FSI companies, and video companies. In some embodiments the advertising may be directed to outside companies, that is companies not having ownership in common with the business entity operating the content generation service. The advertising may include advertising external to the business entity.

The notification may describe the kind of content that can be generated to enable potential users to register for the content generation service. The advertising mechanism may also notify potential users of any new content generation algorithm or new seed content. The potential users may utilize the service once they learn that it can provide them with useful test data.

Content delivery service 115 may provide a mechanism to deliver data for testing applications of applications 130 to the parties. The data may be delivered by methods specified by the applications, such as during registration. In some embodiments, the mechanism may be FTP or another protocol for transferring data over a network. In other embodiments, the mechanism may include shipping disk drives or other storage media to the requester. In still other embodiments, the delivery mechanism may constitute delivering the generated test data to a suitable module of system 100. System 100 may include a software testing facility. A software vendor or other software developer may supply system 100 with versions of its software for testing. In other further embodiments, system 100 may maintain equipment for testing the software. A manufacturer of hardware for an information handling system, for example, may maintain versions of its products for testing. In other further embodiments, the software vendor may supply the equipment. In many embodiments, delivery service 115 may guarantee delivery of the generated contents by the specified delivery method.

Applications 130 may include applications or software for which testing is desired. The applications may run on information handling systems such as information handling system 500 of FIG. 5. The testing may be performed by a vendor to test the workings of its software. In some embodiments, the testing may be part of certification for the applications or software. The software may, for example, be intended to work with software and equipment produced by other companies to solve problems for a vertical. As an example, the hardware manufacturer may provide a framework for technical partners in different verticals to coordinate their products to provide best value solutions. One area of collaboration may involve the certification of technical partners' software and other products based on the hardware manufacturer's various solutions, including intelligent data management (IDM) solutions using DX, EquaLogic and Compellent; system management solutions; and network management solutions.

Systems such as system 100 may improve the process of software testing. Software testing can be very time consuming and tedious. One of the major challenges is the generation of testing content. The size of the necessary content may be large. For example, many of the certification programs in intelligent data management require intensive bandwidth to run their performance tests. Cloud-based services have been developed that have large storage requirements and/or high bandwidth requirements. To test these services adequately, for certification or other purposes, may require massive amounts of data.

System 100 may increase the efficiency of the testing process by speeding up the generation of test data for software validation and performance testing and by rendering delivery mechanisms more efficient. In particular, if testing is performed by an independent software vendor (ISV) certification lab, the automatic generation of test data may reduce the need for shipping large samples of test data. Instead, the lab may generate most, if not all, of the data needed for testing. Further, data generated there for one technical partner may be reused for another technical partner or the same technical partner since it may be stored in a database and indexed by type, vertical, and other characteristics.

Further, deployment of the large content (from megabytes to terabytes (TBs) in size) needed for software testing to a cloud or other testing site may constitute a major challenge. It is, however, a major challenge to perform certification and other tests through remote access to ISV certification labs. ISV certification validations of intelligent data management (IDM) applications, for example, may consist of validating the integrator connectors running on an application server connected to a storage device on a private network. While the network bandwidth in the internal network is not normally an issue, having a dedicated high bandwidth internet connection to transfer TBs of data can be very costly. Further, the validation of the ISV client program transferring data to the ISV application server should be performed by the ISV independently rather than by an ISV certification lab of a hardware manufacturer. Given the problems with remote access to the ISV certification lab and other application-specific issues, the ISV certification lab may ship sample products to half of its IDM related partners for the certification process, and requests that some of its partners ship HDD with large sets of test data to the ISV certification lab physically. All of this shipping may incur a large expense, create a large delay, and consume large network bandwidth. In addition, the shipping process may be inefficient due to restrictions on the use of data. Sensitive data furnished by a technical partner, such as confidential medical records, should not be shared with other technical partners. Further, there may be no mechanism for the sharing and reusing of data. Some embodiments of FIG. 1 may relieve some of these problems by providing efficient delivery mechanisms.

In the embodiment of FIG. 1, the components of system 100 are shown located in a cloud. Cloud computing may refer to the access of computing resources and data via a network infrastructure, such as the Internet. The computing resources and data storage may be provided by linked data centers of the "cloud," i.e., network. In many embodiments, cloud computing resources are provided on demand to customers. As a result, the customers may have access to needed computer resources without having to purchase equipment or construct data centers. In some embodiments, applications 130 may reside in a client computer and may communicate with content generation service 125 over a network such as the Internet. Once content delivery service 115 delivers test data, computers at a site containing the client container may run the applications on the data. In other embodiments, the applications of applications 130 may be run in cloud 150. A software maker may, for example, utilize computing resources contained in cloud 150 to run the applications of applications 130 on the test data generated by system 100. In still other embodiments, systems to generate test data may not reside in a cloud. A company computer installation may, for example, generate test data for the company's software and run the data on the company's applications.

Figure 2:
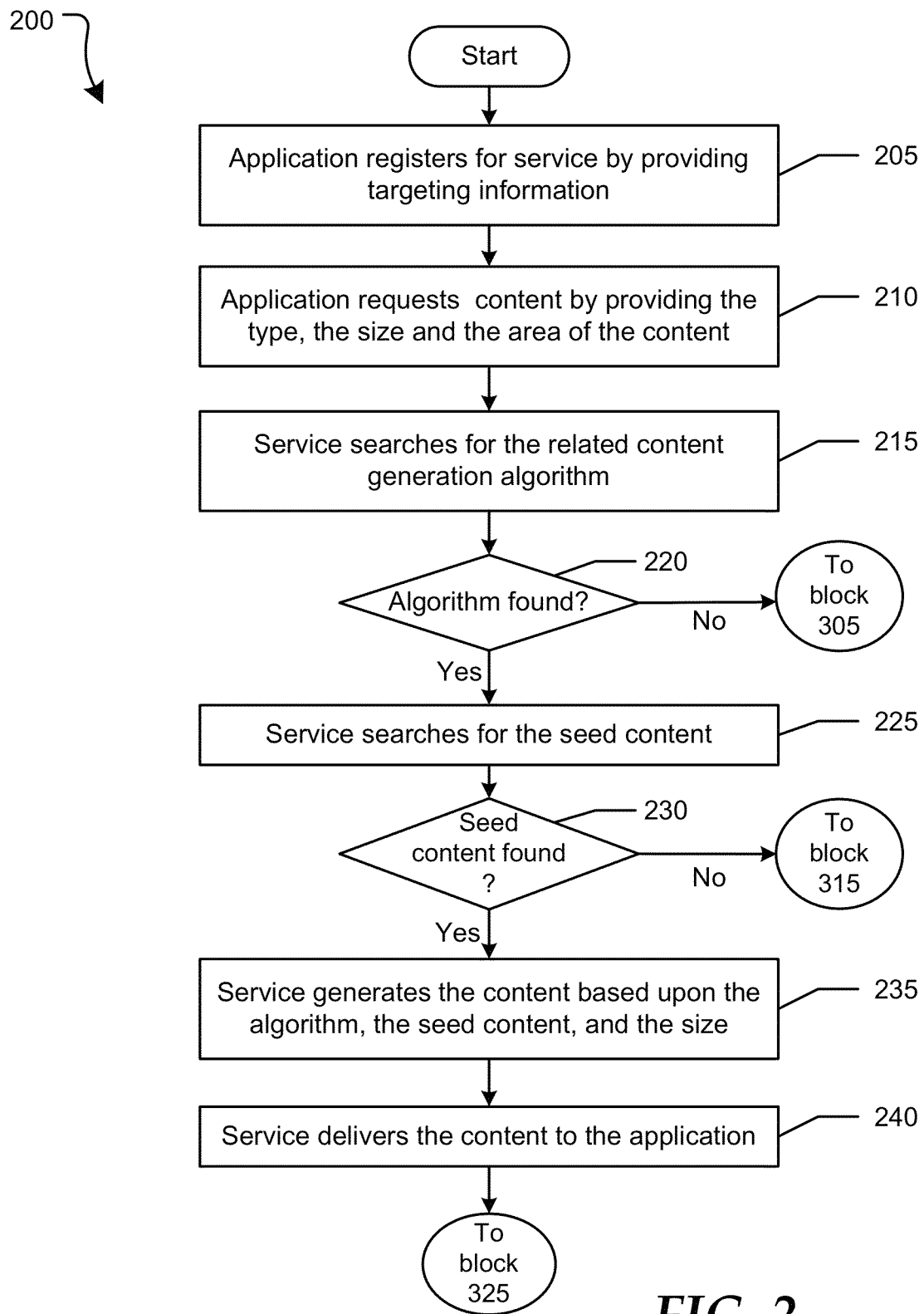
FIGS. 2 and 3 are a flow diagram illustrating a method of providing a content generation service according to another aspect of the disclosure.
Figure 3:
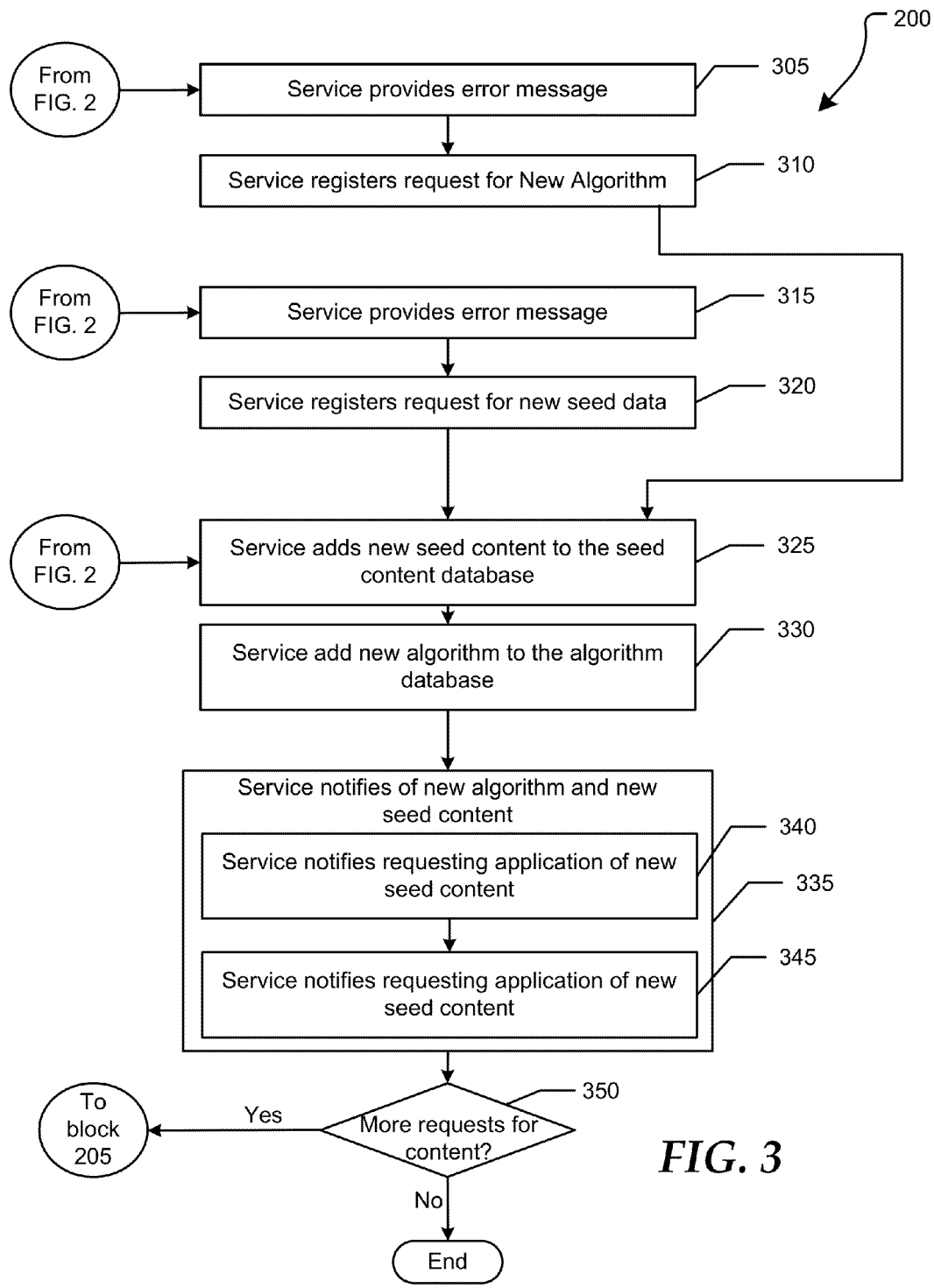

FIGS. 2 and 3 show a method 200 of providing a content generation service. The method may be performed by a content generation service, such as content generation service 125 of FIG. 1. Method 200 begins with an application registering for this service by providing targeting information, such as an IP address, and a delivery mechanism, such as FTP, at block 205. The application may be maintained by a software vendor in a particular industry, a technological party of the business entity providing the service, or a software vendor that produces products over a wide variety of industries.

The application also requests particular content of the test data by describing the test data desired, at block 210. The description may include a description of the type of test data, the size or amount of the test data, and the area of the content to be used. The type of data may include a format, such as video records of a certain type of format or DICOM records of a certain type of format. In some embodiments, such as for database records, the description may even include a description of the fields of the record. For example, the first field may be an identifier, the second field may be text, the third field may be a date, and the fourth field may be a dollar amount. The size may be measured in numbers of records or in amount, such as megabytes or terabytes. The area of content may be a vertical, such as the health care industry or streaming video.

Method 200 includes a search for an algorithm to generate the requested content, at block 215. The search may be through a database of content generation algorithms such as algorithm DB 110 of FIG. 1. The search may be by vertical and type of data. At block 220, a test is performed whether a suitable algorithm is found. If it is not found, method 200 continues to block 305. If a suitable algorithm is found, at block 225, the content generation service searches for suitable seed content. At block 230, a test is performed whether suitable seed content is found. If not, method 200 continues at block 315. If so, method 200 continues at block 235.

At block 235, the content generation service generates content for software testing based upon the seed content, the algorithm, and the desired size. The generation may be performed by applying the content generation algorithm to the seed content to produce the desired number of records or amount of data. In some embodiments, the generated data may be stored for reuse. In some further embodiments, all or a portion may be added to a database of seed content and used to service additional requests. In other further embodiments, it may be added to a separate database of generated content. Data in this database may be sufficiently large that the generation of additional content to satisfy a request is unnecessary. In some cases, the generated data may contain sensitive information, such as confidential medical information. In these cases, the generated data may be scrubbed of the sensitive information before it is saved for reuse. At block 240 the content is delivered to the application. The delivery may be performed by a content delivery service such as content delivery service 115 of FIG. 1.

If, at block 220, a content generation algorithm was not found, at block 305, method 200 includes providing an error message to the application requesting the content. At block 310, a request for a new content generation algorithm is registered. The registration may induce the creation of the desired algorithm as programmers for a content generation service check a list of needed algorithms. The creation may involve examining the data structures involved and writing routines to produce additional records with the data structure.

If, at block 230, appropriate seed content was not found, at block 315, method 200 includes providing an error message to the application requesting the content. At block 320, a request for new seed content generation is registered. The registration may induce the creation of the desired seed content as programmers for a content generation service check a list of needed seed content. In some embodiments, the programmers may receive a description of the fields of a record and may create records satisfying the description. In some cases, some values of fields of the created records may be duplicated and other fields, such as record identification fields, must be serialized.

At block 325, new seed content is added to the seed content database. In some embodiments, a service such as content generation service 125 of FIG. 1 may provide an interface for adding new seed content to a seed content database. The interface may enable a data entry technician to enter the new content by vertical and data type. At block 330, a new algorithm is added to the algorithm database. In some embodiments, a service such as content generation service 125 of FIG. 1 may provide an interface for adding a new algorithm to an algorithm database. The interface may enable a data entry technician to enter the new algorithm by vertical and data type.

At block 335, method 200 includes providing notice of the new seed content and algorithm. The notice may include notifying an application that had requested data that new seed content is available, at block 340. The request for data may have remained unsatisfied because of the absence of suitable seed content. The notice may also include notifying an application that had requested data that a new algorithm is available, at block 345. The request for data may have remained unsatisfied because of the absence of a suitable algorithm for generating data from seed content. At block 350, method 200 tests whether there are additional requests for content. If not, method 200 ends. If so, the method returns to block 205.

In some embodiments, executing the blocks of method 200 may provide a framework or architecture for generating data, such as data for testing. Following the steps may provide a systematic, organized procedure for data generation. In many embodiments, the protocol may be automated. A server may receive a request for data and may generate data in fulfillment of the request through the use of a seed content database, an algorithms database, and a search database.

Figure 4:
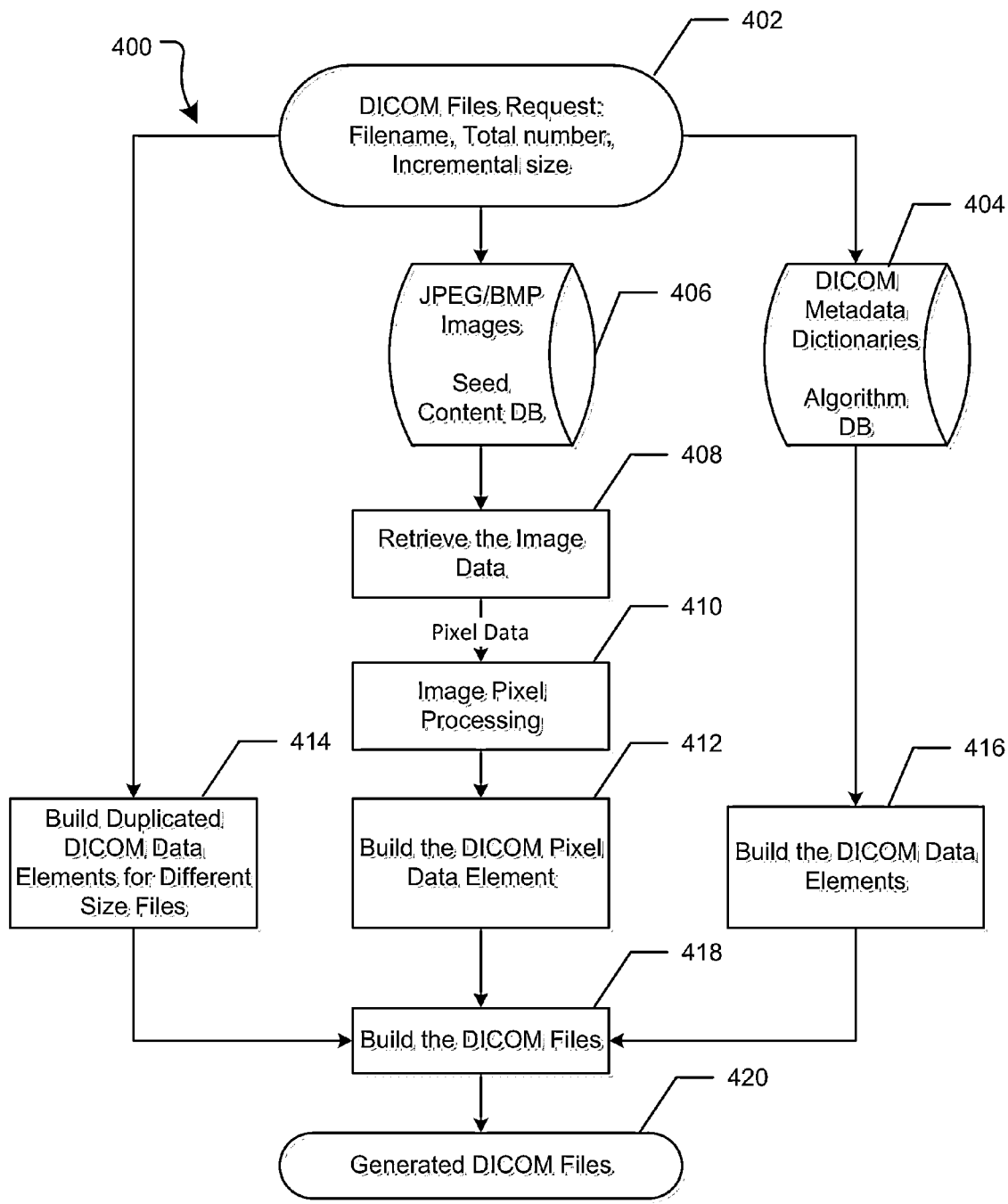
FIG. 4 is a flow diagram illustrating a method of providing a content generation service according to one aspect of the disclosure.

FIG. 4 shows a method 400 of providing a content generation service for DICOM records. The method may be performed by a content generation service, such as content generation service 125 of FIG. 1. DICOM is a standard for medical imaging. The standard includes both rules for the format of the data and protocols for transmitting the data over a network. Devices that process data, such as workstations, and devices that display or reproduce data, such as printers and scanner, may be certified in compliance with DICOM standards. A DICOM data object consists of a number of fields such as name and identification or sequencing value. One special field contains image pixel data, such as the pixels comprising an X-ray.

Method 400 begins with a request for DICOM data, at block 402. The request may include a filename, a total number, and an incremental size. The filename may name a DICOM file containing suitable data, such as data suitable for performing a test of a system for processing DICOM data. The total number may specify a total number of files desired. A test may, for example, be performed on multiple files. The incremental size may specify, for each desired file, the difference in size between the desired file and the named filed. As an example, a requester may name a seed content file of 0.5 gigabytes (G) and may ask for DICOM files of 1G, 3G, and 5G. A system, such as content generation service 125 of FIG. 1, may then generate DICOM data satisfying the request. The generation may utilize different processes to generate data for the different fields of DICOM data.

To generate pixel data for DICOM data, the system may utilize seed content DB 406. Seed content DB 406 may include images of the kind contained in medical records. In some embodiments, the images may be in Joint Photographic Experts Group (JPEG) or bitmap (BMP) format. JPEG is a method of compression of image data. Image data is represented in BMP format as a map of pixels. Method 400 includes retrieving image data suitable for satisfying the request from seed content DB 406, at block 408. The data may, for example, be organized by attributes and retrieved on the basis of attributes provided with the request. At block 410, image pixel processing is performed. At block 412, DICOM pixel elements are built.

Method 400 includes building duplicated DICOM data elements for different size files, at block 414. This duplicated data could be used in fields where the value was unimportant. In testing for example, the value of certain fields may not be important as long as the fields satisfied certain formatting requirements. In such as case, data for the fields could be produced by concatenating duplicate copies of data from the named file. In the above example, data from the 0.5 G file could be concatenated to a copy of the data to produce data for a 1G file. Further concatenations could produce data for the 3G and 5G files.

Method 400 includes using DICOM metadata dictionary 404. The dictionary may describe the format of DICOM records and enable the generation of sample records satisfying DICOM format requirements from seed content. The dictionary may, for example, describe a format for sequencing numbers or record identification values contained in DICOM records. Method 400 includes building DICOM data elements, at block 416. These may be elements with unique sequence numbers or record identification values which comply with the specifications described in DICOM metadata dictionary 404.

Method 400 continues at block 418 with building DICOM files to satisfy the request. The files may be built from the DICOM pixel data elements created in block 412, the duplicated data elements build at block 414, and the DICOM data elements generated at block 416. In some embodiments, some fields of a generated record may be filled from values generated at block 414, some fields of the generated record may be filled from pixel values produced at block 412, and some fields of the generated record may be filled from values, such as sequence numbers or record identification values, produced at block 416. Execution of method 400 thus produces the generated DICOM files 420.

Embodiments of method 400 may enable the efficient generation of test data, such as DICOM data. The test data may be needed for testing an application that processes the data or for testing the integration of an image-processing system and a storage system, such as a Dell™ DX6000™ object storage cluster. Without a method such as method 400, a software vendor or other party may spend three or more weeks to generate test data. The testing may require hundreds of DICOM files of various types. It may cost the party a week or so to collect and prepare all the required DICOM images for testing. In addition, when tested, it has often found the provided DICOM images had internal data integrity problems which greatly impacted object storage I/O testing. Correcting these data integrity issues may add another two weeks to the certification process. On the other hand, most of the DICOM images provided by the vendor are for real patients from hospitals, which are confidential and sensitive information and should not be exposed, thus scrubbing this data would bring out additional cost and overhead for testing data management.

By carrying out some embodiments of method 400, data processing companies can dramatically reduce the above costs and defects and enhance the efficiency in PACS/HIS/

RIS certifications with platforms. In further embodiments, the use of embodiments of method 400 may lead to fast and cost effective data generation and delivery, especially when the service and the applications registered are in the same cloud. Instead of physically shipping the hard drive with contents, or transferring large contents through internet, the contents will be generated on the fly inside the cloud and delivered to the application directly. One result is eliminating a need to transmit the data over a network or test it over a network, thereby saving network bandwidth. In addition, use of the methods may enable reuse of content. Content generated to satisfy one request may be stored and used to satisfy subsequent requests for similar data. In some embodiments, the generated data or a portion may be added to the database of seed content. In other embodiments, the generated data may be stored in a separate data base of content. In some cases, generated data may be scrubbed to remove sensitive information before being stored for reuse. Execution of method 400 may also enable the generation of test data of any required size.

FIG. 5 illustrates a block diagram of an exemplary embodiment of an information handling system, generally designated at 500. In one form, the information handling system 500 can be a computer system that generates content as described in FIG. 1, such as a server. As shown in FIG. 5, the information handling system 500 can include a first physical processor 502 coupled to a first host bus 504 and can further include additional processors generally designated as $n^{th}$ physical processor 506 coupled to a second host bus 508. The first physical processor 502 can be coupled to a chipset 510 via the first host bus 504. Further, the $n^{th}$ physical processor 506 can be coupled to the chipset 510 via the second host bus 508. The chipset 510 can support multiple processors and can allow for simultaneous processing of multiple processors and support the exchange of information within information handling system 500 during multiple processing operations.

According to one aspect, the chipset 510 can be referred to as a memory hub or a memory controller. For example, the chipset 510 can include an Accelerated Hub Architecture (AHA) that uses a dedicated bus to transfer data between first physical processor 502 and the $n^{th}$ physical processor 506. For example, the chipset 510, including an AHA enabled-chipset, can include a memory controller hub and an input/output (I/O) controller hub. As a memory controller hub, the chipset 510 can function to provide access to first physical processor 502 using first bus 504 and $n^{th}$ physical processor 506 using the second host bus 508. The chipset 510 can also provide a memory interface for accessing memory 512 using a memory bus 514. In a particular embodiment, the buses 504, 508, and 514 can be individual buses or part of the same bus. The chipset 510 can also provide bus control and can handle transfers between the buses 504, 508, and 514.

According to another aspect, the chipset 510 can be generally considered an application specific chipset that provides connectivity to various buses, and integrates other system functions. For example, the chipset 510 can be provided using an Intel® Hub Architecture (IHA) chipset that can also include two parts, a Graphics and AGP Memory Controller Hub (GMCH) and an I/O Controller Hub (ICH). For example, an Intel 820E, an 815E chipset, or any combination thereof, available from the Intel Corporation of Santa Clara, Calif., can provide at least a portion of the chipset 510. The chipset 510 can also be packaged as an application specific integrated circuit (ASIC).

The information handling system 500 can also include a video graphics interface 522 that can be coupled to the chipset 510 using a third host bus 524. In one form, the video graphics interface 522 can be an Accelerated Graphics Port (AGP) interface to display content within a video display unit 526. Other graphics interfaces may also be used. The video graphics interface 522 can provide a video display output 528 to the video display unit 526. The video display unit 526 can include one or more types of video displays such as a flat panel display (FPD) or other type of display device.

The information handling system 500 can also include an I/O interface 530 that can be connected via an I/O bus 520 to the chipset 510. The I/O interface 530 and I/O bus 520 can include industry standard buses or proprietary buses and respective interfaces or controllers. For example, the I/O bus 520 can also include a Peripheral Component Interconnect (PCI) bus or a high speed PCI-Express bus. PCI buses and PCI-Express buses can be provided to comply with industry standards for connecting and communicating between various PCI-enabled hardware devices. Other buses can also be provided in association with, or independent of, the I/O bus 520 including, but not limited to, industry standard buses or proprietary buses, such as Industry Standard Architecture (ISA), Small Computer Serial Interface (SCSI), Inter-Integrated Circuit ($I^2C$), System Packet Interface (SPI), or Universal Serial buses (USBs).

In an alternate embodiment, the chipset 510 can be a chipset employing a Northbridge/Southbridge chipset configuration (not illustrated). For example, a Northbridge portion of the chipset 510 can communicate with the first physical processor 502 and can control interaction with the memory 512, the I/O bus 520 that can be operable as a PCI bus, and activities for the video graphics interface 522. The Northbridge portion can also communicate with the first physical processor 502 using first bus 504 and the second bus 508 coupled to the $n^{th}$ physical processor 506. The chipset 510 can also include a Southbridge portion (not illustrated) of the chipset 510 and can handle I/O functions of the chipset 510. The Southbridge portion can manage the basic forms of I/O such as USB, serial I/O, audio outputs, Integrated Drive Electronics (IDE), and ISA I/O for the information handling system 500.

The information handling system 500 can further include a disk controller 532 coupled to the I/O bus 520, and connecting one or more internal disk drives such as a hard disk drive (HDD) 534 and an optical disk drive (ODD) 536 such as a Read/Write Compact Disk (R/W CD), a Read/Write Digital Video Disk (R/W DVD), a Read/Write mini-Digital Video Disk (R/W mini-DVD), or other type of optical disk drive.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method comprising:
   receiving by a computing device a request to generate data, the request including a specification of data to be generated;
   maintaining a database of seed content;
   maintaining a database of algorithms for generating data from seed content;

searching the database of seed content for seed content satisfying the specification of the request;
if seed content is found, searching the database of algorithms for an algorithm to generate data from the seed content in satisfaction of the request;
if the algorithm is found, applying the algorithm to the seed content, thereby generating data;
receiving from a requester of the generation of data an application; and
testing the application on the generated data.

2. The method of claim 1, wherein:
the method further comprises:
advertising a data generation service; and
registering a user for the data generation service in response to the advertisement, wherein the registering comprises receiving targeting information from the user; and
the receiving comprises receiving the request to generate data from the registered user.

3. The method of claim 2, wherein the registering comprises receiving targeting information from the user.

4. The method of claim 1, further comprising:
receiving a specification of a type of delivery for the generated data from a requester of the data; and
delivering the generated data to the requester pursuant to the specification of the type of delivery.

5. The method of claim 4, further comprising guaranteeing delivery of the generated data.

6. The method of claim 4, wherein:
the generating comprises generating data in a cloud; and
the delivering comprises delivering the generated data to the requester within the cloud.

7. The method of claim 1, further comprising:
receiving from a requester of the generation of data an application; and
testing the application on the generated data.

8. The method of claim 1, further comprising:
storing the generated data;
receiving a second request to generate data from a requester; and
transmitting a portion of the generated data to the requester in response to the request.

9. The method of claim 1, further comprising:
not generating data because of failing to find seed content or failing to find an algorithm;
sending an error message to a requester of the generation of data; and
generating a request for additional content to satisfy the request, the additional content to include seed content or an algorithm.

10. The method of claim 9, further comprising:
creating additional seed content in response to the request for additional content; and
notifying the requester of the availability of the additional seed content.

11. The method of claim 9, further comprising:
creating an additional algorithm in response to the request for additional content; and
notifying the requester of the availability of the additional algorithm.

12. The method of claim 9, wherein the searching for seed content comprises searching the database of seed content for seed content satisfying a specification of a vertical line of business and a specification of a type of data, both specifications contained in the specification of the data to be generated.

13. An information handling system comprising:
a database of seed content;
a database of algorithms for generating data from seed content;
a communication module to:
receive requests to generate data, the requests including specifications of data to be generated; and
advertise a data generation service; and
a controller, the controller comprising a processor, to:
search the database of seed content for seed content satisfying one of the specifications of the request;
if seed content is found, search the database of algorithms for an algorithm to generate data in satisfaction of the request from the seed content;
if the algorithm is found, apply the algorithm to the seed content, thereby generating data and
register a user for the data generation service in response to the advertisement, wherein the communication module to receive a request to generate data from the user.

14. A method comprising:
receiving by a computing device a request to generate data, the request including a specification of data to be generated;
maintaining a database of seed content;
maintaining a database of algorithms for generating data from seed content;
searching the database of seed content for seed content satisfying the specification of the request;
if seed content is found, searching the database of algorithms for an algorithm to generate data from the seed content in satisfaction of the request;
if the algorithm is found, applying the algorithm to the seed content, thereby generating data;
not generating data because of failing to find seed content or failing to find an algorithm;
sending an error message to a requester of the generation of data; and
generating a request for additional content to satisfy the request, the additional content to include seed content or an algorithm.

15. The method of claim 14, further comprising:
creating additional seed content in response to the request for additional content; and
notifying the requester of the availability of the additional seed content.

16. The method of claim 14, further comprising:
creating an additional algorithm in response to the request for additional content; and
notifying the requester of the availability of the additional algorithm.

17. The method of claim 14, wherein the searching for seed content comprises searching the database of seed content for seed content satisfying a specification of a vertical line of business and a specification of a type of data, both specifications contained in the specification of the data to be generated.

18. The information handling system of claim 13, wherein the database of seed content is indexed by vertical line of business and data type.

19. The information handling system of claim 13, wherein the controller is to add to the database of algorithms an algorithm for generating additional data from seed content by modifying sequence numbers of records in the seed content.

20. The information handling system of claim 13, wherein:
the communication module is to receive a specification of a format for records; and
the controller is to:
  generate records with the format in response to the receiving; and
  add the records to the database of seed content.

21. The information handling system of claim 13, wherein the controller is to:
receive data;
scrub the data of sensitive content; and
add the scrubbed data to the database of seed content.

22. The information handling system of claim 13, wherein:
the registration includes a receipt of targeting information from the user; and
the communication module is to deliver generated data to the user pursuant to the targeting information.

* * * * *